US011113635B2

(12) United States Patent
Bardin et al.

(10) Patent No.: US 11,113,635 B2
(45) Date of Patent: Sep. 7, 2021

(54) SYSTEMS AND METHODS FOR RE-ISSUING TRAVEL RESERVATIONS BASED ON A SPECIFIC TRAVEL CATEGORY

(71) Applicant: Amadeus S.A.S., Biot (FR)

(72) Inventors: Sebastien Bardin, Le Cannet (FR); Pierre Beguerie, Le Cannet (FR); Araceli Catalano, Provincia de Buenos Aires (AR); Yannick Hoffsess, Antibes (FR); Guadalupe Garcia Pizales, Buenos Aires (AR)

(73) Assignee: AMADEUS S.A.S., Biot (FR)

( * ) Notice: Subject to any disclaimer, the term of this patent is extended or adjusted under 35 U.S.C. 154(b) by 1298 days.

(21) Appl. No.: 15/017,151

(22) Filed: Feb. 5, 2016

(65) Prior Publication Data

US 2017/0228664 A1   Aug. 10, 2017

(51) Int. Cl.
*G06Q 10/02* (2012.01)
*G06Q 50/14* (2012.01)

(52) U.S. Cl.
CPC ............. *G06Q 10/02* (2013.01); *G06Q 50/14* (2013.01)

(58) Field of Classification Search
CPC ................................ G06Q 10/02; G06Q 50/14
USPC ............................................................ 705/5
See application file for complete search history.

(56) References Cited

U.S. PATENT DOCUMENTS

| 6,295,521 B1 * | 9/2001 | DeMarcken | G06Q 10/02 |
| | | | 705/400 |
| 2002/0152100 A1 * | 10/2002 | Chen | G06Q 10/02 |
| | | | 705/5 |
| 2004/0161097 A1 * | 8/2004 | Henry | G06Q 10/02 |
| | | | 379/266.02 |

(Continued)

FOREIGN PATENT DOCUMENTS

WO    WO-2008013827 A2 *   1/2008   ............. G06Q 10/06

OTHER PUBLICATIONS

"Rukes Coding Resource: Guide for Coding Rules in the ATPCO Automated Rules System." Feb. 7, 2005. Airline Tariff Publishing Company. (Year: 2005).*

(Continued)

*Primary Examiner* — John P Go
*Assistant Examiner* — Hunter A Molnar
(74) *Attorney, Agent, or Firm* — Thompson Hine LLP

(57) ABSTRACT

Methods, systems, and computer program products for re-issuing a travel reservation based on a travel category associated with the specific travel reservation. The travel reservation is associated with one of a first travel category and a second travel category. The first travel category includes a plurality of machine-readable codes associated with the travel reservation. In response to determining the travel reservation is associated with the first travel category, the travel reservation is re-issued by a computer-based on the plurality of machine-readable codes associated with the travel reservation. In response to determining that the travel reservation is associated with the second travel category, the (Continued)

computer determines if the travel reservation includes data expressed in machine-readable form. If the travel reservation includes the data expressed in machine-readable form, the computer generates a plurality of prepopulated fields in a format compatible with the first travel category.

15 Claims, 8 Drawing Sheets

(56) References Cited

U.S. PATENT DOCUMENTS

| | | | | |
|---|---|---|---|---|
| 2006/0053055 A1* | 3/2006 | Baggett | ................... | G06Q 10/02 705/14.33 |
| 2008/0010104 A1* | 1/2008 | Williamson | ........... | G06Q 10/02 705/5 |
| 2008/0027768 A1* | 1/2008 | Thurlow | ................ | G06Q 10/10 705/6 |
| 2008/0077453 A1* | 3/2008 | Pedron | ............... | G06Q 30/0239 705/5 |
| 2008/0142581 A1* | 6/2008 | Roebke | .................. | G06Q 10/02 235/375 |
| 2010/0250291 A1* | 9/2010 | Walker | .................... | G07F 9/026 705/5 |
| 2015/0161690 A1 | 6/2015 | Collendavelloo et al. | | |
| 2016/0012353 A1 | 1/2016 | Falkowska et al. | | |
| 2016/0180257 A1* | 6/2016 | Rees | ....................... | G06Q 10/02 705/5 |
| 2018/0204146 A1* | 7/2018 | Shaffi | ..................... | G06Q 10/02 |

OTHER PUBLICATIONS

"Amadeus Ticket Changer User Guide," Apr. 2012, Amadeus, pp. 3-97. (Year: 2012).*

"Amadeus Ticket Reissue For Travel Agencies User Guide," Sep. 14, 2012, Amadeus Training Centre, THAI-Amadeus Southeast Asia Co., Ltd, pp. 1-61. (Year: 2012).*

Amadeus, "Amadeus Ticket Changer", 2011.

Amadeus, "Amadeus Ticket Changer (ATC)", Spanish language user's manual for ATC, 2012.

Amadeus, "Amadeus Ticket Changer (ATC)", machine translation of Spanish language user's manual for ATC, 2012.

Amadeus, "New ATC Awareness Session", sales presentation 2011.

Amadeus, "Amadeus Ticket Changer (ATC)", Spanish language quick reference guide for users of ATC, 2012.

Amadeus, "Amadeus Ticket Changer (ATC)", machine translation of Spanish language quick reference guide for users of ATC, 2012.

* cited by examiner

```
VC CATEGORY NOT FILED BY CARRIER - REISSUE NOT GUARANTEED *4*
LAST TKT DTE 25JAN11 - - SEE SALES RSTNS
PRICED WITH VALIDATING CARRIER BA - REPRICE IF DIFFERENT VC
------------------------------------------------------------
       AL FLGT  BK   DATE  TIME  FARE BASIS     NVB  NVA  BG
BOM
LON BA  0138 S     10APR          SLRCASOW   09APR PC
NYC BA  0117 S     15MAY          SLRCASOW   09APR PC
                     ORIGIN TRVL CURRENCY   REISSUE CURRENCY
OLD BASE FARE         INR         33000
NEW BASE FARE         INR         21000
NON REF AMOUNT        GBP         137.00
FARE BALANCE                                 GBP         0.00
                     PAYMENT CURRENCY
OLD TAX               GBP         178.30
NEW TAX               GBP         198.30
TAX BALANCE                                  GBP        20.00
TICKET DIFFERENCE                            GBP        20.00
PENALTY                                      GBP        25.00
GRAND TOTAL                                  GBP        45.00
TOTAL ADD COLL                               GBP        45.00
RESIDUAL VALUE        GBP         0.00
```

FIG. 6

| | Function | Record 2 of Category 16 | Fabricated Category 31 | |
|---|---|---|---|---|
| Point in Time When Penalty is Applied | When rule is Applied During Travel | Penalty defined at ticket level AND Penalty applies before departure | Departure of Journey = Before | A |
| | | | Fare component = No application | B |
| | | Penalty defined at ticket level AND Penalty applies after departure | Departure of Journey = After | C |
| | | | Fare component = No application | D |
| | | Penalty defined at ticket level AND Penalty applies any time before or after departure | Departure of Journey = Anytime | E |
| | | | Fare component = No application | F |
| | | Penalty not defined at ticket level AND Penalty applies before departure | Departure of Journey = Before | G |
| | | | Fare component = No application | H |
| | | Penalty not defined at ticket level AND Penalty applies after departure | Departure of Journey = After | I |
| | | | Fare component = No application | J |
| | | Penalty not defined at ticket level AND Penalty applies any time before or after departure | Departure of Journey = Anytime | K |
| | | | Fare component = No application | L |
| | Specific Override Rules | OverrideDataTableNumber | Override Data Table | M |
| | No Show Management | Penalty conditions No Show = True and activated | Originally scheduled = After | N |
| | | Penalty conditions No Show = false Penalty Condition Other Than No Show is activated | Originally scheduled = Before | O |
| | | Penalty conditions No Show = false Penalty Condition Other Than No Show is activated | Originally scheduled = Anytime | P |
| | | Penalty conditions No Show = True Penalty Condition Other Than No Show is activated | Originally scheduled = Anytime | Q |
| Reissue Conditions | Change Indicator | Ticket non-refundable = N or B | Change indicator = Not Allowed | R |
| | | Ticket non-refundable = blank or X | Change indicator = Allowed | S |
| Reissue Fee | Fee Amount Definition | First currency charge = xyz | Charge 1 = xyz | T |
| | | Percentage = xyz | Percentage= xyz | U |
| | | Other Currency Charge= xyz | Charge 2= xyz | V |
| | | Higher Lower= xyz | Higher Lower= xyz | W |
| | Fee Application | Penalty defined per coupon | Reissue fee defined at fare component level | X |
| | | Penalty not defined per coupon | Reissue fee defined for the whole ticket | Y |

| Function | Fabricated Category 31 Value |
|---|---|
| 262 → Passenger Data | Blank |
| 264 → Timing of the Re-issued Travel Reservation | Blank |
| 266 → Conditions Relating to the Reissued Travel Reservation | Blank |
| 268 → Penalty Conditions | Blank |
| 270 → Residual Amount Collected Oonce the Travel Reservation has Been Re-issued | Blank |
| 272 → Fare and Travel Limitations | Blank |

| Default Category 31 Records (302) | Value (304) |
|---|---|
| 310 → Departure of Journey | Blank |
| 312 → Fare Component | Blank |
| 314 → Override Date Table | Blank |
| 316 → Originally Scheduled | Blank |
| 318 → Change Indicator | Blank |
| 320 → Charge 1 | Blank |

FIG. 9

SYSTEMS AND METHODS FOR RE-ISSUING TRAVEL RESERVATIONS BASED ON A SPECIFIC TRAVEL CATEGORY

TECHNICAL FIELD

The invention generally relates to computers and computer software, and in particular to methods, systems, and computer program products for re-issuing a specific travel reservation based on a travel category associated with the specific travel reservation.

BACKGROUND

Computer technology is increasingly used in the travel industry to manage, support, book, reserve, and process travel reservations as well as data associated therewith. Generally, third party reservation agents (i.e., travel agents) or travelers may utilize computer-based devices or terminals to interface with a reservation system, such as a Global Distribution System (GDS). A GDS is a proprietary computer system that allows reservation agents and travelers real-time access to airline fares, schedules, and seating availability. Additionally, a GDS also allows for reservation agents and travelers the ability to book travel reservations as well.

In general, airline fares are provided by the airline tariff publishing company (ATPCO) to a GDS. ATPCO is an organization that collects and distributes the latest airline fares of various airlines around the world. ATPCO may provide airline fare data as well as the associated rules that apply to a specific airline fare to the GDS. In particular, ATPCO may group the rules associated with airline fares into various fare categories. For example, the rules associated with voluntary changes to a travel reservation may be defined by category 31, and the rules associated with applicable penalties for making changes to a travel reservation may be defined by category 16. The rules defined by category 31 may be expressed in machine-readable form, and may be processed by a computer-based device in order to make voluntary changes to a specific travel reservation. The rules defined by category 16 may be expressed in machine-readable form, or alternatively in human-readable text. However, unlike the rules defined by category 31, the rules defined by category 16 are unable to be processed by a computer-based device in order to apply penalties to a specific travel reservation. Instead, a reservation agent interprets the rules defined by category 16 and applies the rules to a particular travel reservation accordingly to determine the penalties associated with a specific travel reservation.

In some instances, a traveler may request a ticket exchange after a travel reservation has been booked. Specifically, the traveler may wish to change some aspect of the travel reservation such as, for example, the travel dates, locations, or seating reservations. Exchanging tickets may be a complex and time-consuming process for a reservation agent. In some instances, a ticket exchange performed by a reservation agent may take up to half an hour to perform. Furthermore, sometimes the reservation agent may mistakenly charge a traveler the incorrect price for a ticket exchange. If this error is discovered by the ticket issuer, then the ticket issuer may issue a debit memo to the travel agency. It should be appreciated that ticket exchanges are typically the main source of debit memos. Indeed, approximately ten to fifteen percent of all travel reservations are usually exchanged at least once. Thus, the costs associated by manually performing a ticket exchange may become significant.

There is an approach currently available that allows for automated ticket exchanges. An automated ticket exchange would allow for a traveler to exchange or re-issue a travel reservation by a computer-based device instead of a reservation agent. However, only a very small percentage of all ticket returns are actually eligible for automated ticket exchange, and instead a majority of ticket exchanges are currently only able to be performed by a reservation agent. This is because in at least some instances most airlines only associate their airline fares with ATPCO category 16 and not category 31, and the rules defined by ATPCO category 16 are only capable of being interpreted and applied by an individual, such as a reservation agent. In some other instances, ticket issuers may not share their ATOPCO category 31 rules to reservation agents.

Thus, improved methods, systems, and computer program products for exchanging travel reservations are needed that improve the efficiency of processing travel-related data by computer-based devices.

SUMMARY

In an embodiment of the invention, a method of re-issuing a travel reservation is provided. The method includes determining, by a computer, if the travel reservation is associated with one of a first travel category and a second travel category. The first travel category includes a plurality of machine-readable codes associated with the travel reservation. In response to determining the travel reservation is associated with the first travel category, the method may include re-issuing the travel reservation, by the computer, based on the plurality of machine-readable codes associated with the travel reservation. In response to determining that the travel reservation is associated with the second travel category, the method may include determining, by the computer, if the travel reservation includes data expressed in machine-readable form. In response to determining the travel reservation includes the data expressed in machine-readable form, the method may include generating, by the computer, a plurality of prepopulated fields in a format compatible with the first travel category. At least one of the prepopulated fields is generated based on the data expressed in machine-readable form of the travel reservation. The method may also include re-issuing the travel reservation, by the computer, based on the plurality of prepopulated fields.

In another embodiment of the invention, a system for re-issuing a travel reservation is provided. The system may comprise one or more processors and a memory coupled to the one or more processors. The memory stores data comprising a database and program code that, when executed by the one or more processors, causes the system to determine if the travel reservation is associated with one of a first travel category and a second travel category. The first travel category includes a plurality of machine-readable codes associated with the travel reservation. In response to determining the travel reservation is associated with the first travel category, the system is caused to re-issue the travel reservation based on the plurality of machine-readable codes associated with the travel reservation. In response to determining that the travel reservation is associated with the second travel category, the system is further caused to determine if the travel reservation includes data expressed in machine-readable form. In response to determining the travel reservation includes the data expressed in machine-readable form, the system is further caused to generate a plurality of prepopulated fields in a format compatible with the first travel category. At least one of the prepopulated fields is generated based on the data expressed in machine-readable form of the travel reservation. The system is further caused to re-issue the travel reservation based on the plurality of prepopulated fields.

In another embodiment of the invention, a computer program product is provided for re-issuing a travel reservation. The computer program product comprises a non-transitory computer-readable storage medium and program code stored on the non-transitory computer-readable storage medium that, when executed by one or more processors, causes the one or more processors to determine if the travel reservation is associated with one of a first travel category and a second travel category. The first travel category includes a plurality of machine-readable codes associated with the travel reservation. In response to determining the travel reservation is associated with the first travel category, the one or more processors may re-issue the travel reservation based on the plurality of machine-readable codes associated with the travel reservation. In response to determining that the travel reservation is associated with the second travel category, the one or more processors may determine if the travel reservation includes data expressed in machine-readable form. In response to determining the travel reservation includes the data expressed in machine-readable form, the one or more processors may generate a plurality of prepopulated fields in a format compatible with the first travel category. At least one of the prepopulated fields is generated based on the data expressed in machine-readable form of the travel reservation. The one or more processors may re-issue the travel reservation based on the plurality of prepopulated fields.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 6 is an illustration of a computer display including a message indicating that a travel reservation has been re-issued based on a non-standard technique.

FIG. 7 is an exemplary table listing a plurality of coded records in a format compatible with a second travel category and corresponding prepopulated fields that are in a format compatible with the first travel category.

FIG. 8 is an exemplary table listing various default plurality of prepopulated fields in a format compatible with the first travel category that may be generated by the GDS of FIG. 3 to re-issue a travel reservation.

FIG. 9 is an exemplary table listing various default fields in a format compatible with the first travel category that may be generated by the GDS of FIG. 3 to re-issue a travel reservation.

DETAILED DESCRIPTION

Figure 1:
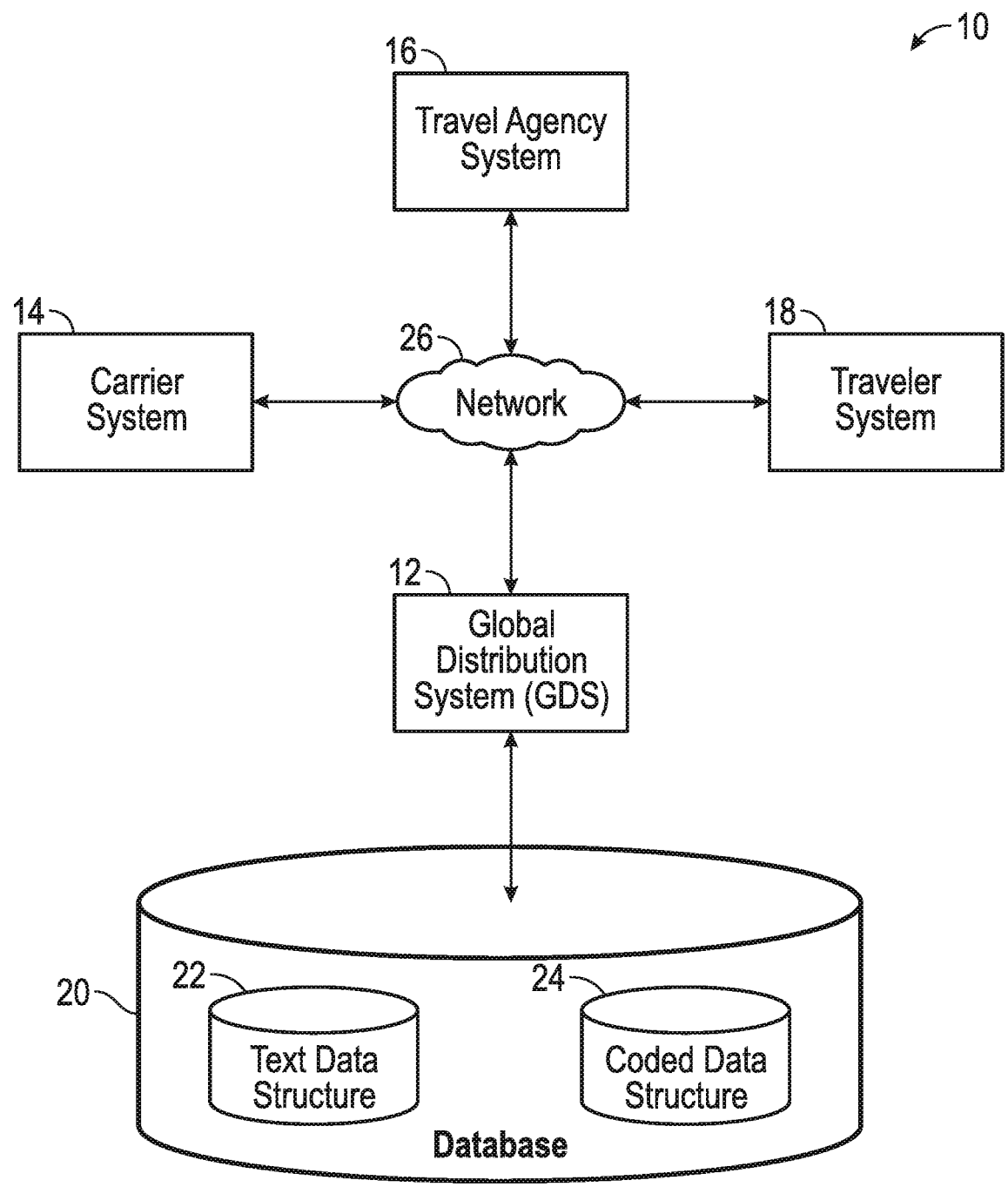
FIG. 1 is a diagrammatic view of an exemplary operating environment for re-issuing a travel reservation including a plurality of computer systems in communication via a network.

Referring now to FIG. 1, an operating environment 10 in accordance with an embodiment of the invention may include a Global Distribution System (GDS) 12, one or more travel service provider systems, such as carrier system 14, one or more indirect seller systems, such as travel agency system 16, and a traveler system 18. The GDS 12 may be in communication with one or more databases, such as rules database 20. Each of the GDS 12, carrier system 14, travel agency system 16, and traveler system 18 may communicate through a network 26. The network 26 may include one or more private or public networks (e.g., the Internet) that enable the exchange of data.

The GDS 12 identifies travel itineraries including flights from multiple airlines, and may also provide travel itineraries that include services such as train travel, hotel rooms, car rentals, sightseeing, and other travel-related activities. The GDS 12 may be configured to facilitate communication between the carrier system 14 and travel agency system 16 by enabling travel agents, validating carriers, or other indirect sellers to book reservations on the carrier system 14 via the GDS 12. The GDS 12 may maintain links to a plurality of carrier systems via the network 26 that enable the GDS 12 to route reservation requests from the validating carrier or travel agency to a corresponding operating carrier. The carrier system 14 and travel agency system 16 may thereby book flights on multiple airlines via a single connection to the GDS 12.

The carrier system 14 may include a computer reservation system (CRS) that enables the GDS 12 or travel agency system 16 to reserve and pay for airline tickets. The carrier system 14 may interact with other carrier systems (not shown), either directly or through the GDS 12, to enable a validating carrier to sell tickets for seats provided by the operating carrier. The operating carrier may then bill the validating carrier for the services provided.

The travel agency system 16 may provide travel agents with an interface for accessing the GDS 12 that enables agents to search for and book travel itineraries. The travel agency system 16 may also include an application accessible by the traveler system 18 that enables the traveler to search for and book travel itineraries without the help of a travel agent. This application may comprise, for example, a travel-related website that is accessible over the network 26 using a web-browser provided by the traveler system 18.

The traveler system 18 may comprise a desktop computer, laptop computer, tablet computer, smart phone, or any other suitable computing device. The traveler may use the traveler system 18 to search for and book travel services by accessing the GDS 12, carrier system 14, travel agency system 16, or any other suitable system though the network 26. For example, the traveler may launch a browser application, and use the browser application to search for travel services on the website provided by the travel agency system 16, or a website provided by the GDS 12, carrier system 14, or any other suitable system. The traveler may book a selected travel service by entering payment information into the website.

The rules database 20 may store industry-standard information pertaining to published airline fares and their associated rules. For example, in one embodiment the rules database 20 may store the Airline Tariff Publishing Company (ATPCO) database of published airline fares and the associated rules, routings and other provisions. The rules database 20 may be updated periodically to reflect any changes in published airline fares and their associated rules.

The rules database 20 may include a plurality of data structures that store the rules associated with published airline fares. Specifically, in the embodiment as illustrated in FIG. 1 the rules database 20 includes a text data structure 22 and a coded data structure 24. The text data structure 22 may specify penalty restrictions related to voluntary changes, involuntary changes, cancellations, and refunds pertaining to travel reservations. In one exemplary embodiment, the category 16 rules are defined by a particular airline and are stored in ATPCO. Category 16 rules specify the penalty restrictions associated with a travel reservation. The data located within the text data structure 22 associated with a specific travel reservation may be expressed in machine-readable form, in human-readable text, or a combination of both. Specifically, the data associated with a particular fare component (i.e., the data associated with a given portion of an itinerary) may only be expressed in either machine-readable form or human-readable text. However, when multiple fare components are combined together to create an entire itinerary or travel reservation, then the data associated with the entire travel reservation may be expressed in both machine-readable form and human-readable text.

Regardless of whether the data associated with an entire travel reservation is expressed in machine-readable form, human-readable text, or a combination of both, it is to be appreciated that the data located in the text data structure 22 is not capable of processing by a computer-based device in order to determine the penalty restrictions applied to a specific travel reservation. Instead, an individual, such as a reservation agent, needs to interpret the data in order to determine the penalty restrictions.

The coded data structure 24 may specify how a re-issue transaction may be automatically processed by a computer-based device to ensure that the correct additional collection or refund amount may be calculated if a traveler modifies a travel reservation. Category 31 rules include the data required to process a voluntary change associated with a travel reservation by a computer-based device. In other words, the data located within the coded data structure 24 includes a plurality of machine-readable codes that may be processed by a computer-based device. For example, the data within the coded data structure 24 associated with a specific travel reservation may be over a hundred bytes in length and defines the exchange policies associated with a specific travel reservation. It is to be understood that the rules database 20 may include a number of other data structures as well, which may derived from other categories that originate from ATPCO (e.g., category 13, etc.). However, only the text data structure 22 and the coded data structure 24 are illustrated in FIG. 1 for purposes of simplicity and clarity. In one embodiment, the data associated with category 31 may be referred to as a first travel category, and the data associated with category 16 may be referred to as a second travel category.

Figure 2:
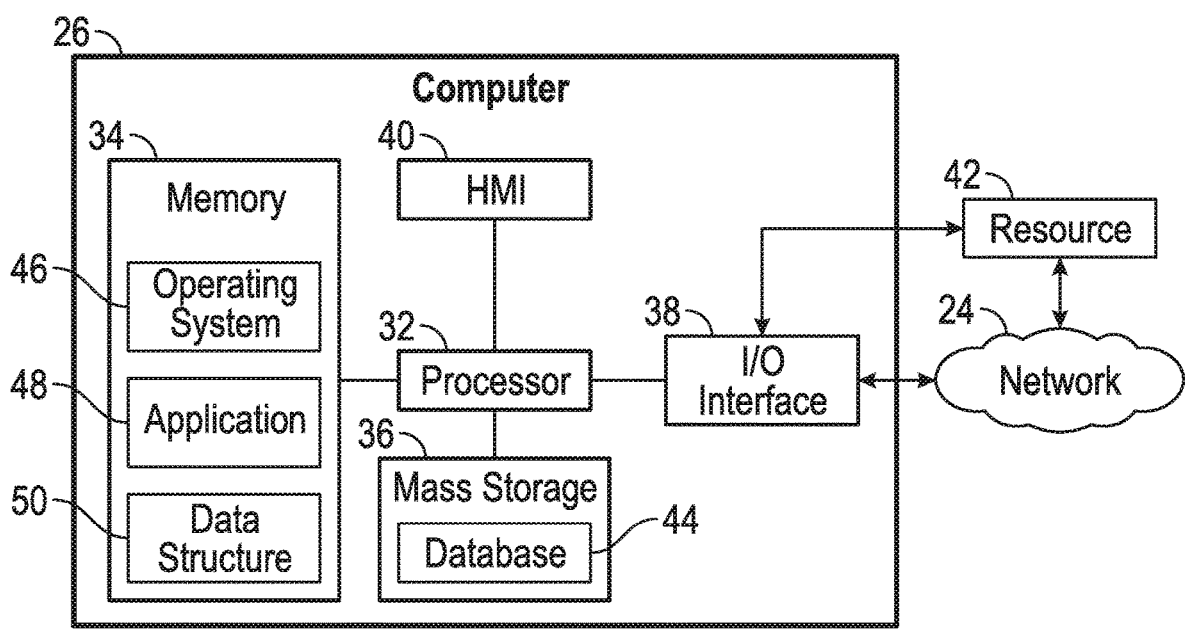
FIG. 2 is a diagrammatic view of an exemplary computer system of FIG. 1.

Referring now to FIG. 2, the GDS 12, carrier system 14, travel agency system 16, and traveler system 18 of operating environment 10 may be implemented on one or more computer devices or systems, such as exemplary computer system 30. The computer system 30 may include a processor 32, a memory 34, a mass storage memory device 36, an input/output (I/O) interface 38, and a Human Machine Interface (HMI) 40. The computer system 30 may also be operatively coupled to one or more external resources 42 via the network 26 or I/O interface 38. External resources may include, but are not limited to, servers, databases, mass storage devices, peripheral devices, cloud-based network services, or any other suitable computer resource that may be used by the computer system 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, volatile or non-volatile solid state device, or any other device capable of storing information.

The processor 32 may operate under the control of an operating system 46 that resides in memory 34. The operating system 46 may manage computer resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, or application 48 to store or manipulate data.

The I/O interface 38 may provide a machine interface that operatively couples the processor 32 to other devices and systems, such as the network 26 or external resource 42. The application 48 may thereby work cooperatively with the network 26 or external resource 42 by communicating via the I/O interface 38 to provide the various features, functions, applications, processes, or modules comprising embodiments of the invention. The application 48 may also have program code that is executed by one or more external resources 42, or otherwise rely on functions or signals provided by other system or network components external to the computer system 30. Indeed, given the nearly endless hardware and software configurations possible, persons having ordinary skill in the art will understand that embodiments of the invention may include applications that are located externally to the computer system 30, distributed among multiple computers or other external resources 42, or provided by computing resources (hardware and software) that are provided as a service over the network 26, such as a cloud computing service.

The HMI 40 may be operatively coupled to the processor 32 of computer system 30 in a known manner to allow a user to interact directly with the computer system 30. The HMI 40 may include video or alphanumeric displays, a touch screen, a speaker, and any other suitable audio and visual indicators capable of providing data to the user. The HMI 40 may also include input devices and controls such as an alphanumeric keyboard, a pointing device, keypads, push-buttons, control knobs, microphones, etc., capable of accepting commands or input from the user and transmitting the entered input to the processor 32.

A database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules.

Figure 3:
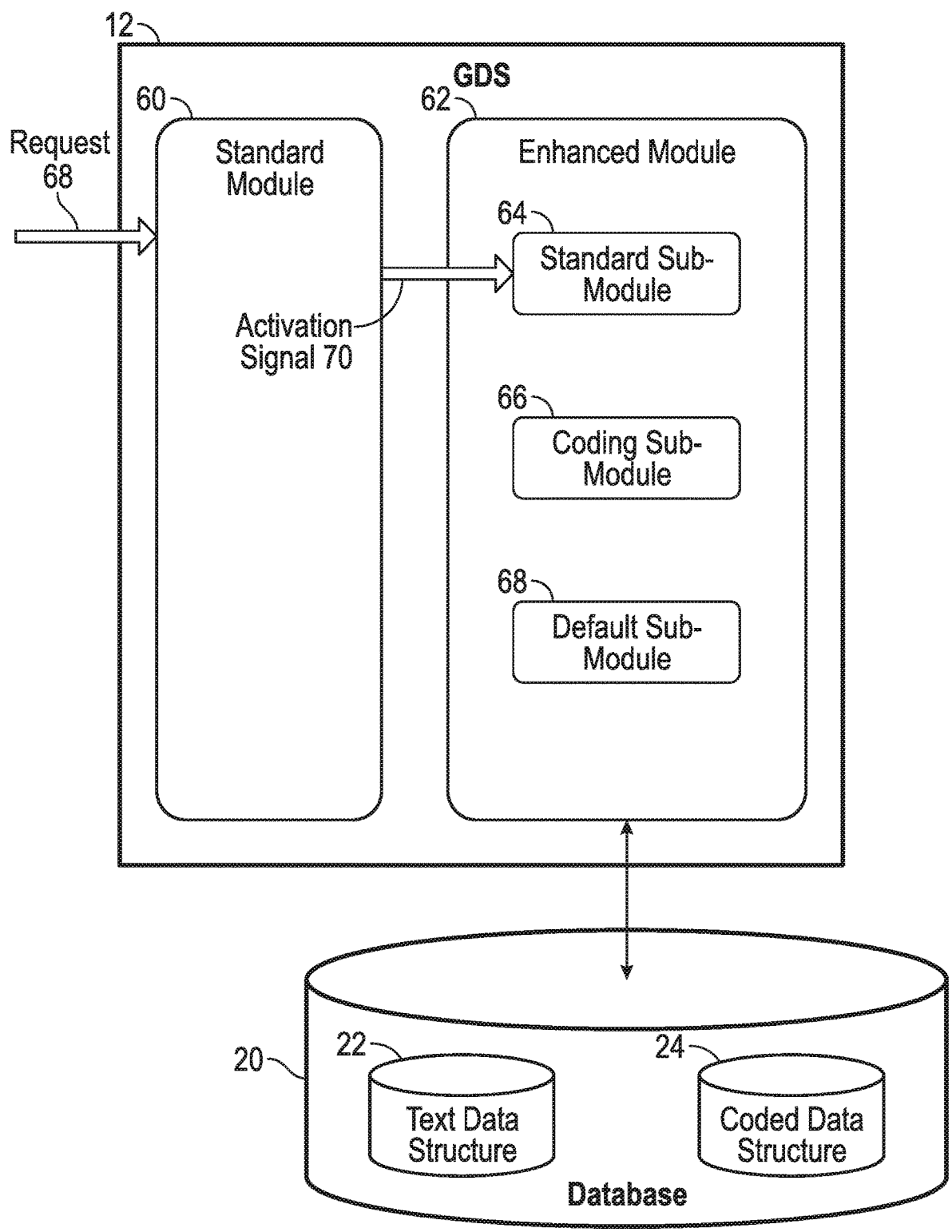
FIG. 3 is a diagrammatic view of the global distribution system (GDS) of FIG. 1, where the GDS is in communication with a rules database.

Turning now to FIG. 3, in an exemplary embodiment of the disclosure the GDS 12 may include a standard module 60 and an enhanced module 62. The enhanced module 62 of the GDS 12 may be communication with the rules database 20. The enhanced module 62 includes a standard sub-module 64, a coding sub-module 66, and a default sub-module 68. The modules 60, 62 and the sub-modules 64, 66, 68 are shown as distinct components, which may indicate the use of modular programming techniques. However, the software design may decrease the extent to which the modules 60, 62 and the sub-modules 64, 66, 68 are distinct by combining at least some program functions of multiple modules into a single module. Moreover, those of ordinary skill in the art will readily understand that the functions attributed to the modules 60, 62 and the sub-modules 64, 66, 68 may be distributed in other ways, or on other systems than those depicted. Thus, embodiments of the invention are not limited to the specific arrangement of systems or modules shown in FIG. 3.

The standard module 60 of the GDS 12 receives a request 68 from either the travel agency system 16 or the traveler system 18 (shown in FIG. 1). The request 68 includes an inquiry as to the cost associated with re-issuing a specific travel reservation (i.e., a re-pricing calculation). The request 68 also includes information relating to a geographical region of the specific travel reservation. In one embodiment, the geographical region may include the origin as well as the destination of the specific travel reservation. In response to receiving the request 68, the standard module 60 may determine if re-pricing for the travel reservation is available based on the geographical region of the travel reservation.

If the standard module 60 determines that re-pricing is available based on the geographical region of the travel reservation, then the standard module 60 may generate an activation signal 70. The activation signal 70 indicates that the subject travel reservation is eligible for re-pricing. In other words, the activation signal 70 acts to trigger a re-issue of the travel reservation by the enhanced module 62. The activation signal 70 may be sent to the standard sub-module 64 of the enhanced module 62.

In response to receiving the activation signal 70, the standard sub-module 64 of the enhanced module 62 determines if the specific travel reservation is associated with either the first travel category (e.g., data compatible with the coded data structure 24) or the second travel category (e.g., data compatible with the coded data structure 22). In other words, the standard sub-module 64 of the enhanced module 62 determines if the data associated with the specific travel reservation is expressed in machine-readable code that may be processed by a computer-based device.

Figure 4:
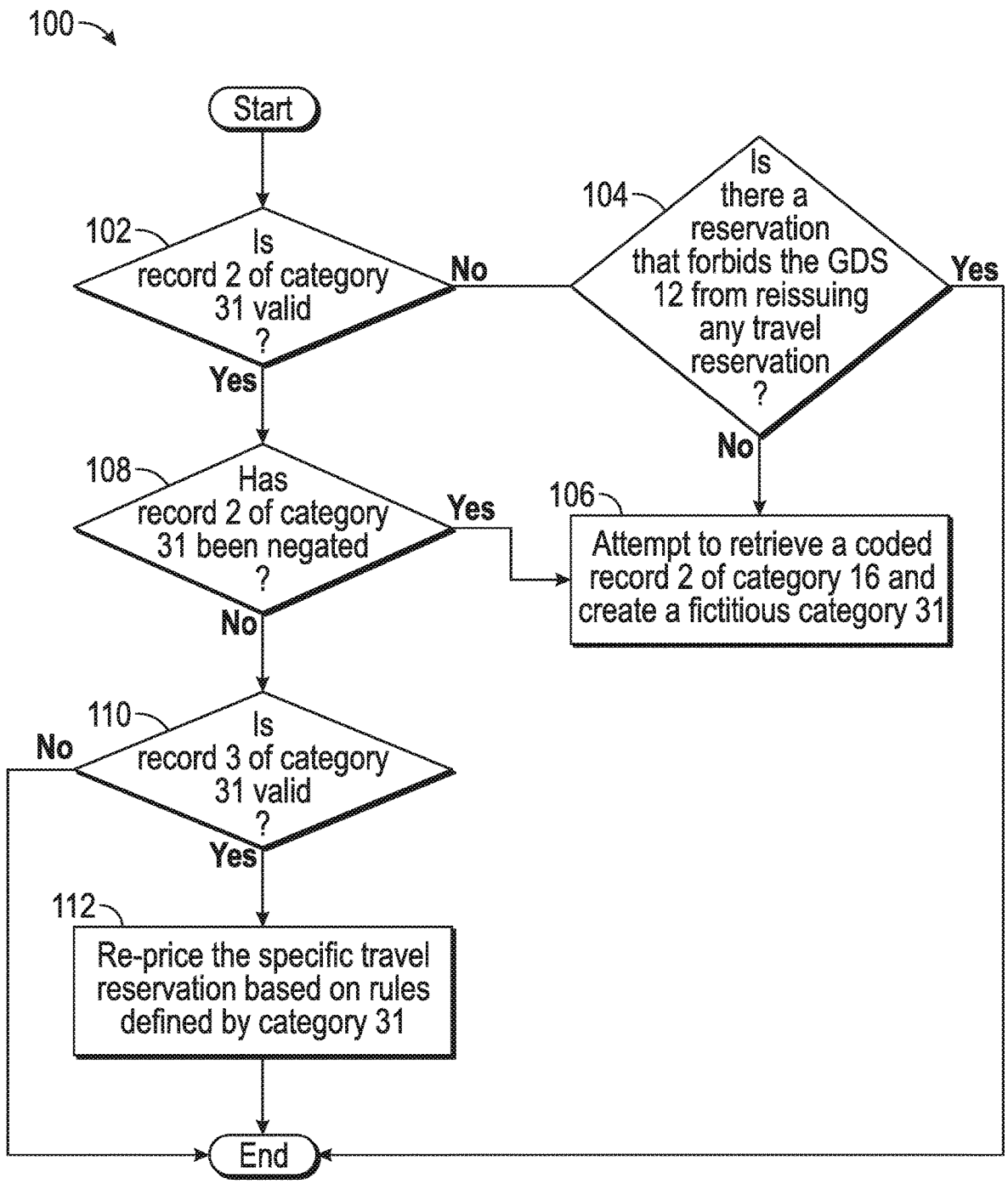
FIG. 4 is a flowchart that may be executed by the GDS of FIG. 3 to determine whether data associated with a specific travel reservation is expressed in machine-readable code that may be processed by a computer-based device.

Turning now to FIG. 4, a flowchart that depicts a process 100 that may be performed by the standard sub-module 64 of the enhanced module 62, or some other suitable module provided by the GDS 12, to determine if the travel reservation is based on data compatible with the data stored in the coded data structure 24 is shown.

Referring to both FIGS. 3 and 4, the process 100 may begin at block 102, where the standard sub-module 64 of the enhanced module 62 attempts to validate or find data representative of a record 2 associated with category 31 of the specific travel reservation. Record 2 is a data entity that contains identification fields that match the specific travel reservation. For example, identification fields such as the geography and the fare class of the specific travel reservation may be contained by record 2. If the record 2 of category 31 is not found, this is an indication that the specific travel reservation is not associated with category 31, and the process 100 may then proceed to block 104.

In block 104, the process 100 determines if there is a restriction that prevents the GDS 12 from re-issuing any travel reservation that is not associated with category 31. For example, some airlines do not allow for travel reservations to be re-issued if they are not associated with category 31. If this condition is true (the "YES" branch of block 104), then the process 100 may generate an error message that is communicated over the HMI 40 of the computer system 30 (FIG. 2). For example, a message reading "TRANSACTION NOT ALLOWED/RE-ISSUE MANUALLY" may be displayed on the HMI 40 of the computer system 30. The message provides an indication that a travel agent needs to re-issue the specific travel reservation manually. The process 100 may then terminate. However, if this condition is false (the "NO" branch of block 104), then the process 100 may proceed to block 106.

In block 106, the coding sub-module 66 may attempt to retrieve a coded record 2 of category 16 associated with the particular travel reservation. The coding sub-module 66 may create a plurality of prepopulated fields that may be in a format compatible with category 31 (e.g., the first travel category) based on one or more retrieved coded record 2s of category 16. The plurality of prepopulated fields in a formal compatible with category 31 may also be referred to as fabricated category 31 records. Creation of the fabricated category 31 records is described in greater detail below, and is illustrated by the flowchart shown in FIG. 5.

Referring back to block 102, if the record 2 of category 31 is found, then the process 100 may proceed to block 108. In block 108, the process determines if the record 2 of category 31 has been negated. Specifically, if record 2 of category 31 has been marked or is indicated as not being applicable to the specific travel reservation, this is an indication that record 2 of category 31 has been negated. If the record 2 of category 31 has been negated, then process 100 may proceed to block 106. As explained above, in block 106, the coding sub-module 66 may create a plurality of prepopulated fields that may be in a format compatible with category 31 based on the coded record 2 of category 16. However, if record 2 of category 31 has not been negated, then process 100 may proceed to block 110.

In block 110, the process 100 may then attempt to find a record 3 of category 31 of the specific travel reservation. Record 3 is a data entity that contains that actual coded data that corresponds to the identification fields contained in record 2. If the record 3 of category 31 is not found, then the process 100 may terminate. It is to be appreciated that terminating the process 100 in response to no record 3 of category 31 being found is standard practice that is currently being implemented.

Referring back to block 110, if record 3 of category 31 is found, then this means that the data associated with the travel reservation is associated with category 31. Accordingly, process 100 may proceed to block 112. In block 112, the process 100 may re-price the specific travel reservation based on the rules defined in category 31. In other words, the specific travel reservation may be re-issued based on the machine-readable codes associated with the specific travel reservation. Process 100 may then terminate.

It is to be appreciated that the standard sub-module 64 of the enhanced module 62 considers the data associated with an entire travel reservation, and not just a single leg or portion of a trip. Specifically, for example, if only an outbound fare component of the specific travel reservation include data expressed machine-readable code that may be processed by a computer-based device, while the inbound fare component is not expressed in machine-readable code, then the standard sub-module 64 determines that the specific travel reservation is not expressed in machine-readable code.

As mentioned in block 106 of process 100, the coding sub-module 66 may attempt to retrieve a coded record 2 of category 16 for the specific travel reservation if no record 2 of category 31 is found. It is to be appreciated that the coded record 2 of category 16 is expressed in machine-readable form, even though the rules defined by category 16 are unable to be processed by a computer-based device in order to apply penalties to a travel reservation. If the coding sub-module 66 is successful in retrieving the coded record 2 of category 16 from the specific travel reservation, then the coding sub-module 66 may create the fabricated category 31 record. However, some instances the specific travel reservation may not include a coded record 2 of category 16. In other words, the specific travel reservation is not expressed in machine-readable form. For example, the specific travel reservation may be written in human-readable text, and therefore the specific travel reservation does not include a coded record 2. If the specific travel reservation does not include at least one coded record 2, or if the coding sub-module 66 is unable to retrieve at least one coded record 2 of category 16 of the specific travel reservation, then the default sub-module 68 may then generate a plurality of default fields that may be in a format compatible with category 31, which is described in greater detail below.

Figure 5:
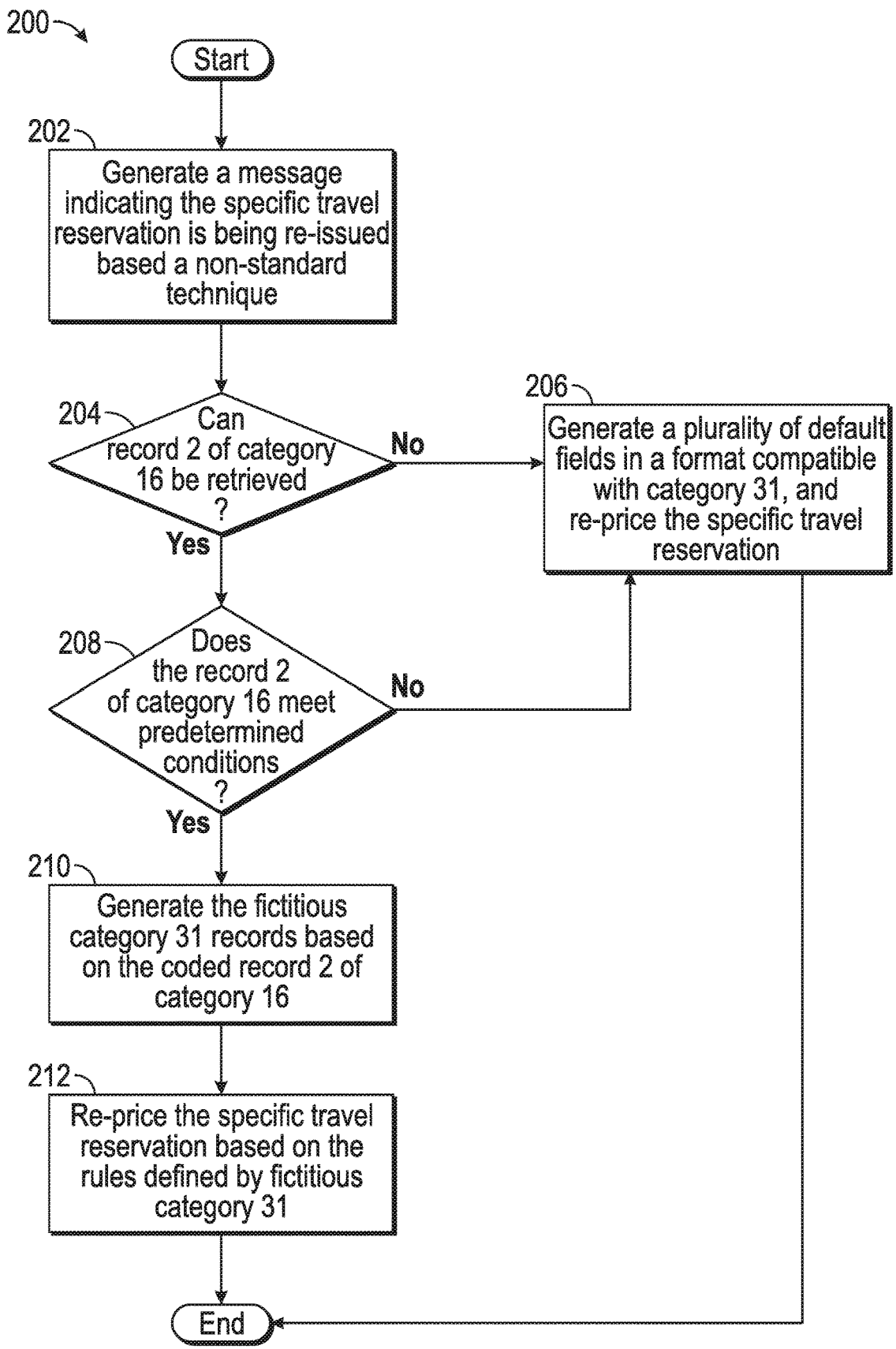
FIG. 5 is a flowchart that may be executed by the GDS of FIG. 3 to generate a plurality of prepopulated fields that are in a format compatible with a first travel category.

Turning now to FIG. 5, a flowchart that depicts a process 200 that may be performed by the coding sub-module 66 of the enhanced module 62 (shown in FIG. 3), or some other suitable module provided by the GDS 12, to generate the fabricated category 31 record is shown. Referring to both FIGS. 3 and 5, the process 200 may begin at block 202, where the process 200 may generate a message providing an indication that the specific travel reservation is being re-issued based on a non-standard technique. In other words, the message may provide an indication to a traveler or a reservation agent that the specific travel reservation is being calculated based on data that is not associated with category 31.

FIG. 6 is an exemplary illustration of a display 230 that is part of a computer system associated with the GDS 12, such the computer system 30 shown in FIG. 2. The display 230 represents the data that a travel reservation may view as a travel reservation is being re-issued. A message 232 may be shown along a top portion 234 of the display 230. Specifically, the message 232 is placed above all other pricing messages and travel-related information 236 associated with the specific travel reservation. In the embodiment as shown in FIG. 6, the message 232 reads "VC Category Not Filed By Carrier—Re-issue Not Guaranteed". However, it is to be appreciated that the message 232 is merely exemplary in nature. Indeed, the message 232 may include any wording that indicates that the specific travel reservation being re-issued based on a non-standard technique. Turning back to FIGS. 3 and 5, once the message 232 is generated, process 200 may then proceed to block 204.

In block 204, the process attempts to retrieve at least one coded record 2 of category 16 of the specific travel reservation. However, in some instances, category 16 of the specific travel reservation may be entirely written in human-readable text such that no coded record 2 exists. If the specific travel reservation does not include at least one coded record 2 (i.e., the rules pertaining to category 16 are written in human-readable text), or if the coding sub-module 66 is unable to retrieve at least one coded record 2 of category 16 of the specific travel reservation, then process 200 may proceed to block 206.

In block 206, the default sub-module 68 may then generate a plurality of default fields that are in a format compatible with category 31. The plurality of default fields may also be referred to as default category 31 records. Creation of the default category 31 records is described in greater detail below, and is illustrated in a table shown in FIG. 9. Once the default category 31 records are generated, the process 200 may re-price the specific travel reservation based on the rules defined by the default category 31 records. Process 200 may then terminate.

Referring back to block 204, if the coding sub-module 66 of the enhanced module 62 is successful in retrieving at least one coded record 2 of category 16 of the specific travel reservation, then process 200 may then proceed to block 208. In block 208, the coding sub-module 66 of the enhanced module 62 determines if the coded record 2 of category 16 meets a first predetermined condition and a second predetermined condition. The first predetermined condition ensures that the specific travel reservation allows for voluntary changes (i.e., the 'Application Voluntary' field is set to TRUE). Alternatively, the first predetermined condition ensures that the specific travel reservation is refundable (i.e., the 'Ticket Non-Refundable' field is set to either N or B). Furthermore, in addition to the coded record 2 of category 16 being either voluntary or refundable, the second predetermined condition requires one of the following four conditions to be activated based on a penalty condition being activated within the specific travel reservation: a no show condition (i.e., the field 'Penalty Conditions NoShow is set to TRUE), a re-reroute with re-issue (i.e., the field 'Penalty Conditions RerouteWithReissue' is set to TRUE), a replacement (i.e., the field 'Penalty Conditions Replacement' is set to TRUE), or a change without re-issue (i.e., the field 'Penalty Conditions ChangeWithoutReissue' is set to TRUE).

If either the first predetermined condition or the second predetermined condition is not satisfied, then process 200 may proceed to block 206, where the default sub-module 68 generates a plurality of default fields that are in a format compatible with category 31, and is described in greater detail below. However, if both the first predetermined condition and the second predetermined condition are satisfied, then process 200 may proceed to block 210.

In block 210, the process 200 may generate the fabricated category 31 records based on one or more coded record 2s of category 16 retrieved in block 204 of process 200. It is to be appreciated that for each coded record 2 of category 16, at least one corresponding coded record 2 of category 31 is created. However, category 16 entries do not typically include as many records or entries as category 31 records. Thus, several fabricated category 31 records may be generated based on a default values if no corresponding category 16 records are found. The generation of the fabricated category 31 records is described in greater detail below and is illustrated in FIGS. 7-8. Once the fabricated category 31 records have been generated, process 200 may proceed to block 212.

In block 212, the process 200 may re-price the specific travel reservation based on the rules defined by the fabricated category 31 generated in block 210. Process 200 may then terminate.

FIG. 7 illustrates an exemplary table 250 illustrating a plurality of coded record 2s of category 16 and the corresponding fabricated category 31 records that are generated. Specifically, the table 250 includes column 252 which lists the functions defined by the coded record 2 of category 16, column 254 which lists the coded record 2 of category 16, and column 256 which lists the corresponding fabricated category 31 record. As may be seen in FIG. 7, rows A-Q of the table 250 define a point in time when the category 16 penalty is applied during a journey. Specifically, rows A-L define when the category 16 penalty is applied as a passenger is traveling. For example, row A defines a coded record 2 of category 16 where an applicable penalty is defined at a ticket level, where an exchange fee or penalty may be defined by either category 16 or 31, and may apply to an entire journey or just a portion of the journey. As seen in row A, the applicable penalty is applied before departure of the flight. The corresponding fabricated category 31 record lists a departure of journey=before (i.e., the penalty is applied before a passenger departs on the journey), and a fare component=no application, where a fare component an itinerary portion of which a particular ATPCO rule applies.

Row M of the table 250 defines specific override rules, where an override data table number means that existing codes for either category 16 or 31 rules will be carried over. Rows N-Q of the table 250 define penalty conditions in the event a passenger does not show up for a flight (i.e., no show management). Rows R and S define re-issue conditions based on whether the specific travel reservation is non-refundable. For example, row R defines a coded record 2 of category 16 if the ticket is non-refundable, and corresponding fabricated category 31 record lists that a modification to the existing travel reservation is not allowed (i.e., Change Indicator=Not Allowed). Rows T-Y generally define re-issues fees, where rows T-W define the fee amount definition. For example, row T defines a coded record 2 of category 16 where a first currency charge=xyz, where xyz represents a numerical value. The corresponding fabricated category 31 record lists Charge 1=xyz, where charge 1 represents the numeric value of a penalty. Row U defines a coded record 2 of category 16 where a percentage value based on an applicable fare amount is defined, row V defines a coded record 2 of category 16 where other currency charges are defined, and row W defines a coded record 2 of category 16 where higher/lower=xyz. The reissue fee may be based on either rows T and V (which are static values) or as a percentage value as seen in row U, and row W selects either the higher or the lower value of the two. Finally, rows X-Y define the fee application for a re-issue fee, where row X defines a coded record 2 of category 16 where a penalty is defined per coupon, and row Y defines a coded record 2 of category 16 where a penalty is not defined per coupon.

In addition to the fabricated category 31 rules shown in FIG. 7, the coding sub-module 66 of the enhanced module 62 of the GDS 12 (shown in FIG. 3) may also generate a plurality of default fabricated category 31 records. As mentioned above, this is because there are typically not as many category 16 records or entries as category 31 records, and therefore default categories based on a predetermined value may need to be generated. FIG. 8 illustrates an exemplary table 260 listing the various default fabricated category 31 records that may be generated by the coding sub-module 66 of the enhanced module 62.

In one embodiment, the table 260 may list passenger data 262, timing of the re-issued travel reservation 264, the conditions relating to the re-issued travel reservation 266, penalty conditions 268, a residual amount collected once the travel reservation has been re-issued 270, and fare and travel limitations 272 associated with the specific travel reservation. The default fabricated category 31 records are left blank so as to be broad and non-restrictive as possible.

It is to be appreciated that FIG. 8 and the associated description of the default fabricated category 31 records is not intended to be an exhaustive listing, and that other entries or different entries may also be generated as well. In one exemplary embodiment, the passenger data 262 may include default fabricated category 31 records such as, for example, the passenger type code (PTC) for a passenger who is associated with the specific travel reservation being re-issued, and the first and last occurrences of passengers traveling together. The timing of the re-issued travel reservation 264 may include default fabricated category 31 records such as, for example, the ticket validity (i.e., if the departure of the re-issued travel reservation is valid), an indication if a re-issued pricing unit is before or after an origin of the original pricing unit, and advance reservation validation. The conditions relating to the re-issued travel reservation 266 may include default fabricated category 31 records such as, for example, a re-issue table number which refers to a table containing data instructing how to process a voluntary change, the type of ticket transaction which indicates the type of ticket transaction being processed (e.g., a re-issue transaction), endorsement requirements for the re-issued travel reservation, and a domestic/international combination which indicates whether a domestic carrier may grant permission to an international carrier to apply specific international re-issue rules to the domestic portion of the trip. The penalty conditions 268 may include default fabricated category 31 records such as, for example, a minimal amount of additional funds that are made, an applicable currency for the minimal amount of additional funds (e.g., dollars, euros, etc.), the number of decimal places for the minimal amount of additional funds, and any tags that indicate whether a discount may be applied. The residual amount collected once the travel reservation has been re-issued 270 may include default fabricated category 31 records such as, for example, a residual versus penalty value which is a compensation method that determines an applicable residual amount owed to the passenger, a form of refund to apply which indicated how a refund may be given (where the default value is the original form of payment), and a residual/penalty hierarchy which indicates how to resolve a situation if different fare components include different residual versus penalty value.

The fare and travel limitations 272 may include default fabricated category 31 records such as, for example, travel limitations, outbound limitations which indicate if changes to an outbound portion or a first fare component are permitted, and if changes to a flight number are permitted. The fare and travel limitations 272 may also include fare breaks. In particular, the fare breaks may include a term which indicates if changes to a fare break points is permitted, a first break which indicates if the first fare component of a ticket may be re-priced using a fare that is different from the original ticket fare, a coupon which indicates the restrictions on how an itinerary may be re-priced based on the type and quantity of flight coupons remaining, fully flown which indicates whether the previously ticketed travel points of a fully flown fare component may be re-priced, and a same point table which indicates table that represents an origin and a destination are considered the same point. The fare and travel limitations 272 may also include re-issue fare restrictions, dates which indicate if a new travel for a particular fare component are on the same or a different date than the date of travel of the original ticket, fare rule provisions of the original fare that may be validated or revalidated, advanced ticketing restrictions, and carrier restrictions.

Referring now to FIG. 9, an exemplary table 300 listing the default category 31 records that may be generated by the default sub-module 68 (shown in FIG. 3). As explained above, in some instances category 16 of the specific travel reservation may be entirely written in human-readable text such that no coded record 2 exists. If the specific travel reservation does not include at least one coded record 2 (i.e., the rules pertaining to category 16 are written in human-readable text), or if the coding sub-module 66 is unable to retrieve at least one coded record 2 of category 16 of the specific travel reservation, then the default sub-module 68 may then generate a plurality of default category 31 records. Table 300 includes a column 302 listing the type of default category 31 record, and column 304 lists the corresponding value of the default category 31 record.

As seen in table 300, a departure of journey 310, a fare component 312, an override date table number 314, an originally scheduled 316, a change indicator 318, and charge 1 320 may be defined by the table 300. The values in column 304 of the default category 31 records 302 are left blank so as to be as broad as possible. Thus, no penalties are applied to the specific travel reservation. It should also be appreciated if a particular category 31 record is not listed in table 300, then the records listed in the tables shown in FIGS. 6-8 may be used instead.

Referring generally to the figures, the disclosed system improves the overall efficiency of processing data associated with the specific travel reservation, and also solves a problem that is rooted in computer technology. Specifically, if the rules associated with the specific travel reservation are not expressed in machine-readable code that may be readily processed by a computer-based device, then a computerized travel reservation system may be unable to re-issue the specific travel request. Instead, a reservation agent may need to carefully read and interpret the rules associated with the specific travel reservation, and processes the request accordingly. Indeed, the disclosed system provides a solution to this problem by generating prepopulated fields or default fields that are expressed in machine-readable code that are readily processed by a computer-based device. Accordingly, the disclosed system transforms the specific travel reservation into a format that may be processed by a computerized travel reservation system. Thus, the specific travel reservation no longer needs to be interpreted by an individual such as a reservation agent, and instead is in a format that may be processed by a computerized reservation system.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method comprising:
   determining, by a computer, that a standard record of a first travel category is unavailable for a fare component of a travel reservation, each standard record of the first travel category comprising a reissuance rule expressed as machine-readable code;
   determining that the fare component of the travel reservation is associated with a second travel category corresponding to records that are incompatible with a format compatible with the first travel category;
   determining, based on an evaluation of the records that are incompatible with the format compatible with the first travel category, that a coded record of the second travel category is available for the fare component of the travel reservation;
   determining that at least one predetermined condition of a plurality of predetermined conditions is not satisfied;
   in accordance with a determination that at least one predetermined condition of the plurality of predetermined conditions is not satisfied, generating, by the computer, a plurality of additional fields to create a non-standard record having the format compatible with the first travel category based on the evaluation of the records of the second travel category, wherein the second travel category includes coded records having reissuance rules expressed as machine-readable code and non-coded records having reissuance rules expressed as human-readable text; and
   re-issuing the travel reservation, by the computer, using the non-standard record having the format compatible with the first travel category.

2. A system comprising:
   one or more processors; and
   a memory coupled to the one or more processors, the memory storing program code that, when executed by the one or more processors, causes the system to:
   determine that a standard record of a first travel category is unavailable for a fare component of a travel reservation, each standard record of the first travel category comprising a reissuance rule expressed as machine-readable code;
   determine that the fare component of the travel reservation is associated with a second travel category corresponding to records that are incompatible with a format compatible with the first travel category;
   determine, based on an evaluation of the records that are incompatible with the format compatible with the first travel category, that a coded record of the second travel category is available for the fare component of the travel reservation;
   determine that at least one predetermined condition of a plurality of predetermined conditions is not satisfied;
   in accordance with a determination that at least one predetermined condition of the plurality of predetermined conditions is not satisfied, generate a plurality of additional fields to create a non-standard record having the format compatible with the first travel category based on the evaluation of the records of the second travel category, wherein the second travel category includes coded records having reissuance rules expressed as machine-readable code and non-coded records having reissuance rules expressed as human-readable text; and
   re-issue the travel reservation using the non-standard record having the format compatible with the first travel category.

3. A computer program product comprising:
   a non-transitory computer-readable storage medium; and
   program code stored on the non-transitory computer-readable storage medium that, when executed by one or more processors, causes the one or more processors to:
   determine that a standard record of a first travel category is unavailable for a fare component of a travel reservation, each standard record of the first travel category comprising a reissuance rule expressed as machine-readable code;

determine that the travel reservation is associated with a second travel category corresponding to records that are incompatible with a format compatible with the first travel category;

determine, based on an evaluation of the records that are incompatible with the format compatible with the first travel category, that a coded record of the second travel category is available for the fare component of the travel reservation;

determine that at least one predetermined condition of a plurality of predetermined conditions is not satisfied;

in accordance with a determination that at least one predetermined condition of the plurality of predetermined conditions is not satisfied, generate a plurality of additional fields to create a non-standard record having the format compatible with the first travel category based on the evaluation of the records of the second travel category, wherein the second travel category includes coded records having reissuance rules expressed as machine-readable code and non-coded records having reissuance rules expressed as human-readable text; and re-issue the travel reservation using the non-standard record having the format compatible with the first travel category.

4. The method of claim 1, wherein the non-standard record includes a plurality of prepopulated fields generated using the coded record of the second travel category responsive to verifying that the coded record of the second travel category satisfies the plurality of predetermined conditions.

5. The method of claim 1, wherein the plurality of predetermined conditions include a first predetermined condition and a second predetermined condition, the first predetermined condition requiring the travel reservation to either be refundable or permit voluntary changes, and the second predetermined condition requiring one of four conditions to be activated: a no show condition, a re-reroute with re-issue condition, a replacement condition, and a change without re-issue condition.

6. The method of claim 1, wherein the evaluation of records determines that a coded record of the second travel category is unavailable for the fare component of the travel reservation, and wherein the non-standard record includes a plurality of default fields.

7. The method of claim 6, wherein the standard record of the first travel category is a category 31 record 3 airline tariff publishing company (ATPCO) data structure and the coded record of the second travel category is a category 16 record 2 ATPCO data structure.

8. The method of claim 1, wherein each record of the second travel category comprises fewer fields for data entry than each record of the first travel category.

9. The method of claim 1, further comprising:
receiving an activation signal configured to trigger re-issuance of the travel reservation by the computer, the activation signal received responsive to a determination based on a geographical region associated with the travel reservation.

10. The system of claim 2, wherein the non-standard record includes a plurality of prepopulated fields generated using the coded record of the second travel category responsive to verifying that the coded record of the second travel category satisfies the plurality of predetermined conditions.

11. The system of claim 2, wherein the plurality of predetermined conditions include a first predetermined condition and a second predetermined condition, the first predetermined condition requiring the travel reservation to either be refundable or permit voluntary changes, and the second predetermined condition requiring one of four conditions to be activated: a no show condition, a re-reroute with re-issue condition, a replacement condition, and a change without re-issue condition.

12. The system of claim 2, wherein the evaluation of records determines that a coded record of the second travel category is unavailable for the fare component of the travel reservation, and wherein the non-standard record includes a plurality of default fields.

13. The system of claim 12, wherein the standard record of the first travel category is a category 31 record 3 airline tariff publishing company (ATPCO) data structure and the coded record of the second travel category is a category 16 record 2 ATPCO data structure.

14. The system of claim 2, wherein each record of the second travel category comprises fewer fields for data entry than each record of the first travel category.

15. The system of claim 2, wherein the program code further causes the system to:
receive an activation signal configured to trigger re-issuance of the travel reservation, the activation signal received responsive to a determination based on a geographical region associated with the travel reservation.

* * * * *